US007221793B2

(12) United States Patent
Stavely et al.

(10) Patent No.: US 7,221,793 B2
(45) Date of Patent: May 22, 2007

(54) SYSTEMS AND METHODS FOR PROVIDING SPATIALLY-VARIED DEMOSAICING

(75) Inventors: Donald J. Stavely, Windsor, CO (US); Christopher A. Whitman, Fort Collins, CO (US); Robert E. Sobol, Ft. Collins, CO (US); Kevin J. Matherson, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 826 days.

(21) Appl. No.: 10/445,971

(22) Filed: May 27, 2003

(65) Prior Publication Data

US 2004/0240726 A1 Dec. 2, 2004

(51) Int. Cl.
*G06K 9/00* (2006.01)
(52) U.S. Cl. ...................... 382/167; 382/162
(58) Field of Classification Search ................ 382/162
See application file for complete search history.

(56) References Cited

U.S. PATENT DOCUMENTS

| 5,040,064 | A | * | 8/1991 | Cok ...................... 348/392.1 |
| 5,778,106 | A | * | 7/1998 | Juenger et al. ............. 382/275 |
| 6,343,146 | B1 | * | 1/2002 | Tsuruoka et al. ........... 382/163 |
| 6,483,941 | B1 | * | 11/2002 | Li ............................. 382/167 |
| 6,747,702 | B1 | * | 6/2004 | Harrigan ..................... 348/335 |
| 6,747,766 | B1 | * | 6/2004 | Kamisuwa et al. ......... 358/505 |
| 6,829,016 | B2 | * | 12/2004 | Hung ......................... 348/581 |
| 6,933,970 | B2 | * | 8/2005 | Koshiba et al. ............. 348/273 |

FOREIGN PATENT DOCUMENTS

| JP | 2004/145117 | 5/2001 |
| JP | 2001-186533 A | 7/2001 |
| JP | 2002/112276 | 4/2002 |
| JP | 2002-359771 A | 12/2002 |
| JP | 2004-241991 A | 8/2004 |
| WO | WO 03/107274 A3 | 12/2003 |

* cited by examiner

*Primary Examiner*—Wenpeng Chen
*Assistant Examiner*—Yuzhen Ge

(57) ABSTRACT

Disclosed are systems and methods for providing spatially-varied demosaicing. In one embodiment, a system and method pertain to collecting color information sensed by image sensor pixels, and estimating color information as to a pixel under consideration that is not collected by the pixel by weighting color information collected by adjacent pixels that are positioned in a direction in which color is shifted due to lateral chromatic aberration.

11 Claims, 8 Drawing Sheets

SYSTEMS AND METHODS FOR PROVIDING SPATIALLY-VARIED DEMOSAICING

BACKGROUND

Digital cameras and other image capture devices use image sensors that comprise a plurality of sensor elements, commonly known as pixels. Each pixel collects light information from the viewed scene that is to be captured. In cases in which the device is configured to capture color images, each pixel collects light information as to a particular color (e.g., red, green, or blue) from the light that is transmitted to the sensor from the device lens system.

If the image capture device only comprises a single image sensor, as opposed to a separate, dedicated image sensor for each captured color, the light that is transmitted to the sensor is filtered so that each individual pixel only collects information as to a single color. This filtering is typically achieved using a two-dimensional color filter array that is laid over the image sensor.

Most filter arrays comprise a mosaic of color filters that are aligned with the various pixels of the image sensor. The most common filter arrays implement what is known in the art as a Bayer pattern. When a Bayer pattern is used, filtering is provided such that every other pixel collects green light information (i.e., is a "green pixel") and the pixels of alternating rows of the sensor collect red light information (i.e., are "red pixels") and blue light information (i.e., are "blue pixels"), respectively, in an alternating fashion with pixels that collect green light information When the image data is read out from the image sensor, information for each color (e.g., red, green, and blue) that is used to generate a resultant image must be provided for each pixel position. However, in that each pixel only collects information as to one color, the color information for the colors not collected by any given pixel must be estimated so that complete color frames can be obtained for each of the colors used to generate the image. Accordingly, if red, green, and blue are used to generate the image, red and blue light information must be estimated for each green pixel, blue and green light information must be estimated for each red pixel, and red and green light information must be estimated for each blue pixel.

The process of estimating color information in this manner is known as demosaicing and is typically accomplished through application of one or more demosaicing algorithms. Such demosaicing algorithms estimate the missing color information for each given pixel position by evaluating the color information collected by adjacent pixels. For instance, when estimating the red light information for a green pixel, the demosaicing algorithm evaluates red (and potentially blue and green) color information collected by neighboring pixels. Through this process, the missing color information can be interpolated. By way of example, demosaicing may be accomplished by evaluating information collected by pixels within a five-by-five or seven-by-seven matrix of pixels that provide information contained in a "kernel". Typically, the pixel under consideration is located in the center of this matrix so that information collected from pixels in every direction is obtained. Through this process, the missing color information can be estimated so that complete color frames may be obtained.

Such demosaicing algorithms are applied under the assumption that the lens system that transmits light to the image sensor is ideal. In reality, however, lens systems introduce error caused by lens aberrations. Such aberrations may comprise, for example, spherical, geometric, astigmatic, radial, axial, and chromatic aberrations. Although lens designers strive to compensate for, and therefore nullify the effects of, such aberrations, not all of the aberrations can be completely corrected at the same time. In particular, reducing aberrations inherently increases the complexity of the lens design, which increases its cost and size to implement in an imaging system. Therefore, some form of aberration is normally always present.

Because demosaicing algorithms are not designed to account for such aberrations, less than ideal images can result. One example is the effect of lateral chromatic aberration. The term "lateral chromatic aberration" describes the phenomenon in which different colors are magnified by different degrees by the lens system. This causes the various color components (e.g., red, blue, and green) to be shifted in relation to each other in a degree that increases as a function of distance away from the center of the lens, and therefore away from the center of the image.

An example of such color shifting is illustrated in FIG. 1, which shows an image 100 that contains an image of an object in the form of a white ellipse 102. As indicated in FIG. 1, color fringes, in this case a blue fringe 104 and a red fringe 106 (color not indicated in FIG. 1), are generated that outline the ellipse 102 as a result of the red, green, and blue light information used to create the image of the ellipse being magnified to different extents such that the colors do not precisely overlap each other. This shifting results in perceived color fringing and blurring of the captured image.

SUMMARY

Disclosed are systems and methods for providing spatially-varied demosaicing. In one embodiment, a system and method pertain to collecting color information sensed by image sensor pixels, and estimating color information as to a pixel under consideration that is not collected by the pixel by weighting color information collected by adjacent pixels that are positioned in a direction in which color is shifted due to lateral chromatic aberration caused by a lens system.

BRIEF DESCRIPTION OF THE DRAWINGS

The disclosed systems and methods can be better understood with reference to the following drawings. The components in the drawings are not necessarily to scale.

DETAILED DESCRIPTION

As identified in the foregoing, lateral chromatic aberration of an image capture device lens system can create color fringes that blur the resultant images captured by the device. As is described in this disclosure, however, the effects of this aberration can be corrected, at least in part, through digital processing. More particularly, the effects of lateral chromatic aberration can be compensated for by demosaicing the image in a laterally-varying manner such that colors that tend to shift in a given direction away from the center of the image are shifted back into registration with other colors captured by the device.

Disclosed herein are embodiments of systems and methods for providing spatially-varied demosaicing. Although particular embodiments are disclosed, these embodiments are provided for purposes of example only to facilitate description of the disclosed systems and methods. Accordingly, other embodiments are possible.

Figure 2:
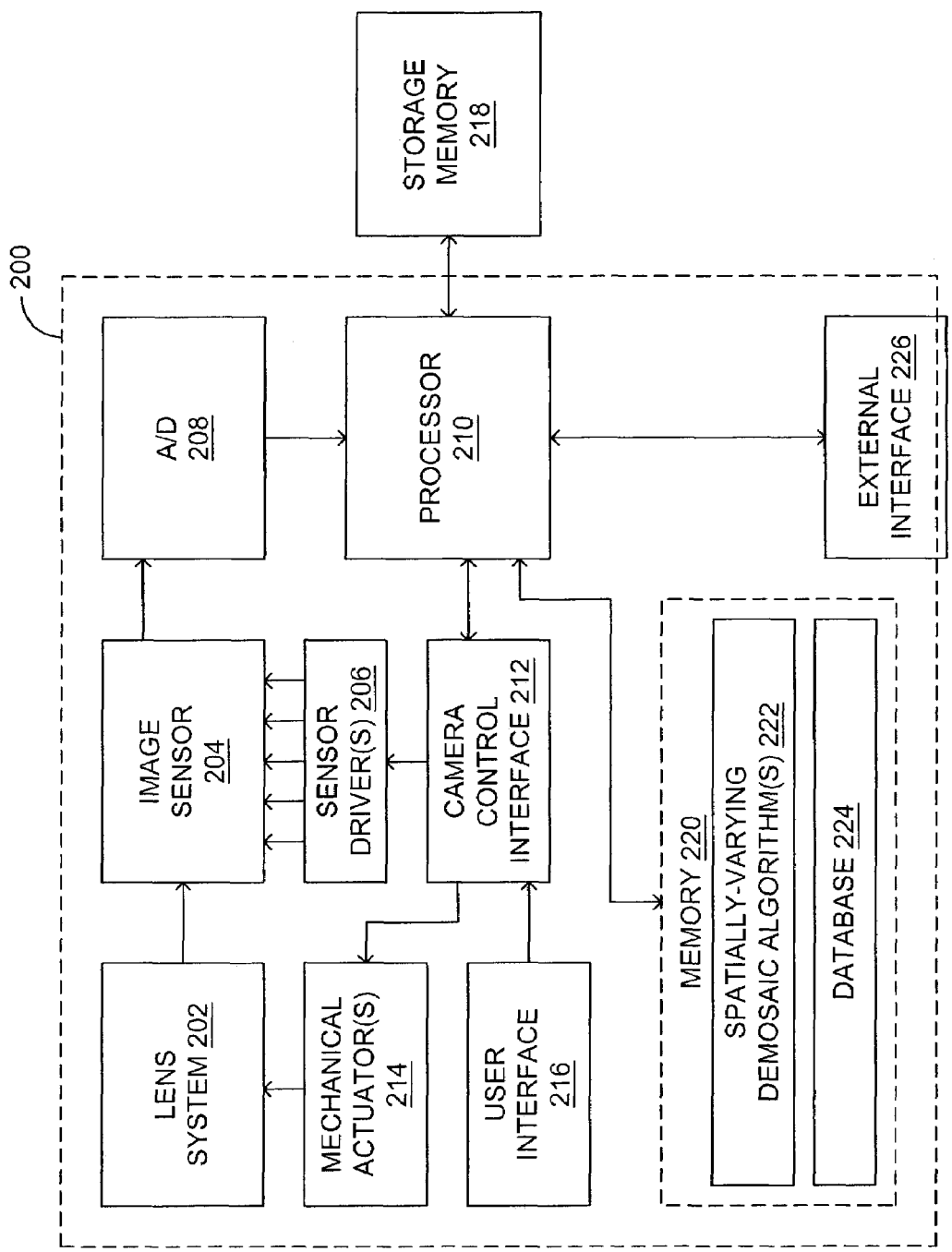
FIG. 2 is a block diagram of an embodiment of an image capture device that provides spatially-varied demosaicing that compensates for lateral chromatic aberration.

Referring now to the drawings, in which like numerals indicate corresponding parts throughout the several views, FIG. 2 illustrates an embodiment of an image capture device 200 that is configured to provide spatially-varied demosaicing. In the example of FIG. 2, the device 200 is configured as a digital camera. Although a digital camera is illustrated in FIG. 2 and explicitly discussed herein, the device 200 more generally comprises any device that digitally captures images, for example scanners, video cameras, and optical sensors. For the purposes of discussion of FIG. 2, however, the image capture device 200 is referred to from this point forward as a "camera."

As indicated FIG. 2, the camera 200 includes a lens system 202 that conveys images of viewed scenes to an image sensor 204. The lens system 202 comprises one or more lenses, as well as other components that control or modify the collection of light for the purposes of capturing images. Such components include, for example, a shutter and an aperture mechanism. The image sensor 204 comprises a plurality of sensor elements or pixels that receive light that is filtered by a filter array of the sensor. By way of example, the image sensor 204 comprises a charge-coupled device (CCD) or a complimentary metal oxide semiconductor (CMOS) sensor that is driven by one or more sensor drivers 206. The analog image signals captured by the sensor 204 are provided to an analog-to-digital (A/D) converter 208 for conversion into binary code that can be processed by a processor 210.

Operation of the sensor driver(s) 206 is controlled through a camera control interface 212 that is in bi-directional communication with the processor 210. Also controlled through the interface 212 are one or more mechanical actuators 214 that are used to control operation of the lens system 202. These actuators 214 include, for instance, motors used to control the shutter, aperture mechanism, focus, and zoom. Operation of the camera control interface 212 may be adjusted through manipulation of a user interface 216. The user interface 216 comprises the various components used to enter selections and commands into the camera 200 such as a shutter-release button and various control buttons provided on the camera.

Captured digital images may be stored in storage memory 218, such as that contained within a removable solid-state memory card (e.g., Flash memory card). In addition to this memory, the camera comprises permanent (i.e., non-volatile) memory 220. In the embodiment of FIG. 2, the memory 220 includes one or more spatially-varying demosaic algorithms 222 that are used to compensate for lateral chromatic aberration introduced by the lens system 202. In addition, the memory 220 may also comprise a database 224 that contains information that is used during the demosaicing process.

In addition to the aforementioned components, the camera 200 comprises an external interface 226 through which data (e.g., images) may be transmitted to another device, such as a personal computer (PC). By way of example, this interface 226 comprises a universal serial bus (USB) connector.

Figure 3:
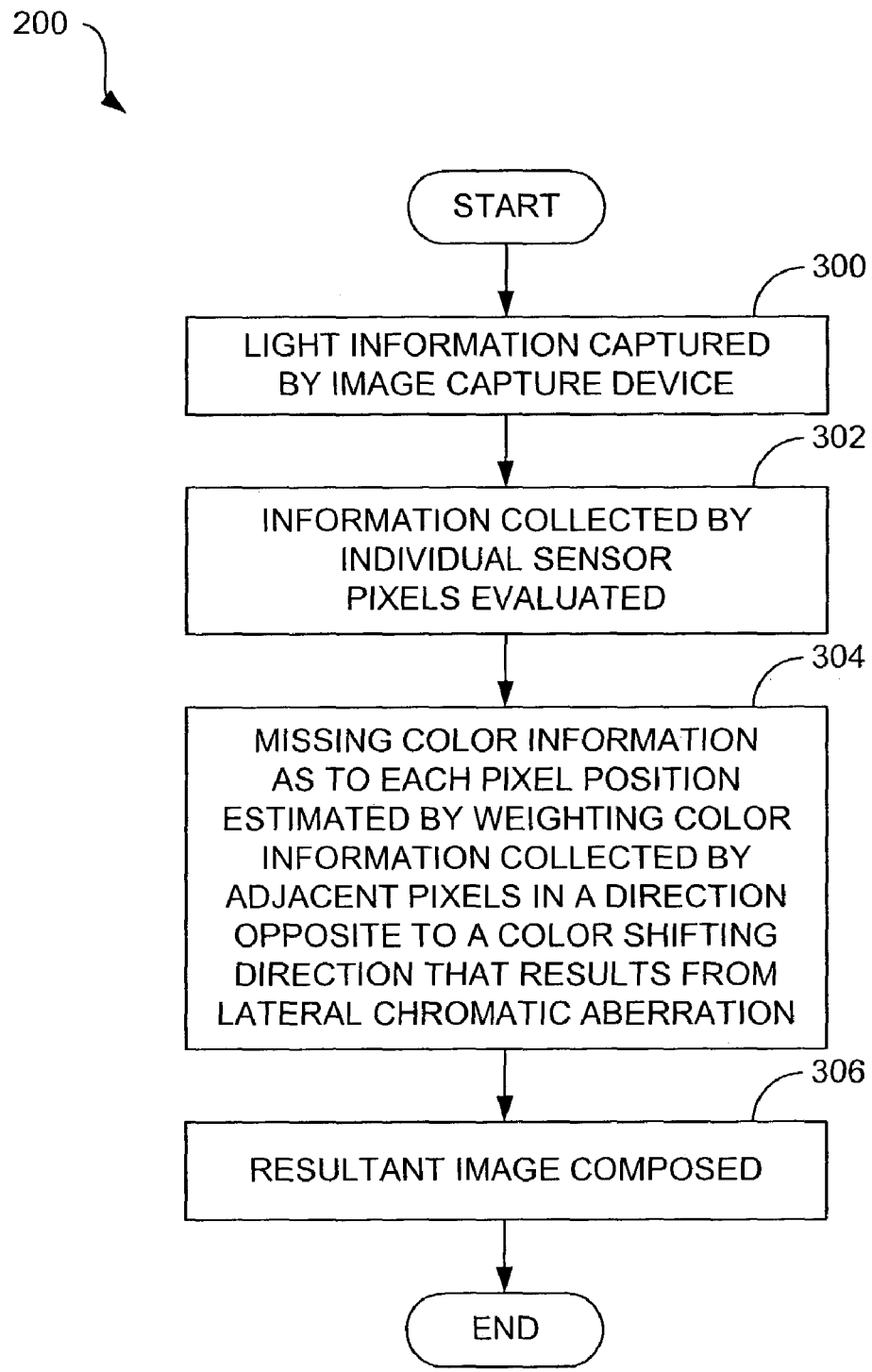
FIG. 3 is a flow diagram illustrating an embodiment of a method for providing spatially-varied demosaicing.

FIG. 3 is a flow chart of a method for providing spatially-varied demosaicing. It is noted that any process steps or blocks described in the flow diagrams of this disclosure may represent modules, segments, or portions of program code that includes one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Beginning with block 300, light information is captured by the image capture device 200 and, more particularly, by the image sensor 204 of the device. Once this information is captured, the information collected by the individual sensor pixels is evaluated, as indicated in block 302, and, as indicated in block 304, missing color information of each pixel position is estimated by weighting information collected by adjacent pixels that are positioned in a direction of color shifting direction that results from lateral chromatic aberration of the lens system 202. The estimation process depends upon the colors that are used to generate the resultant image. By way of example, these colors comprise red, green, and blue. In addition, the missing color information as to a given pixel position depends upon the color information collected by the pixel associated with that particular position. For instance, red and blue information is estimated for a pixel that collects green light information (i.e., a green pixel).

The manner in which the estimation is performed may further depend upon the particular configuration of the image capture device 200 that is used. In one embodiment, the missing color information is estimated by demosaicing the image using a kernel that is shifted in a direction of the color shifting created by the lateral chromatic aberration. In exception or addition, the missing color information is estimated by weighting information collected by pixels that are positioned, relative to the pixel under consideration, in a direction of the color shifting. As is described below, such weighting can be achieved by applying shifting information (e.g., shifting the kernel to adjust processing coefficients) in accordance with the zone of the image in which the pixel under consideration is located. More detailed examples of the estimation (i.e., demosaicing) process are provided below with reference to FIGS. 4-8.

Irrespective of the manner in which the estimation is performed, it is performed in relation to the known characteristics of the device lens system 202. For example, the direction and degree of the color shifting created by lateral chromatic aberration of the lens system 202 can be used to determine the manner in which the estimation is performed.

Once the missing color information has been estimated, completed color frames (e.g., in red, green, and blue) are generated and, as indicated in block 306, a resultant image is composed from these frames. At this point, the image may be further processed and/or compressed, if desired, and stored to memory (e.g., storage memory 218).

Figure 4:
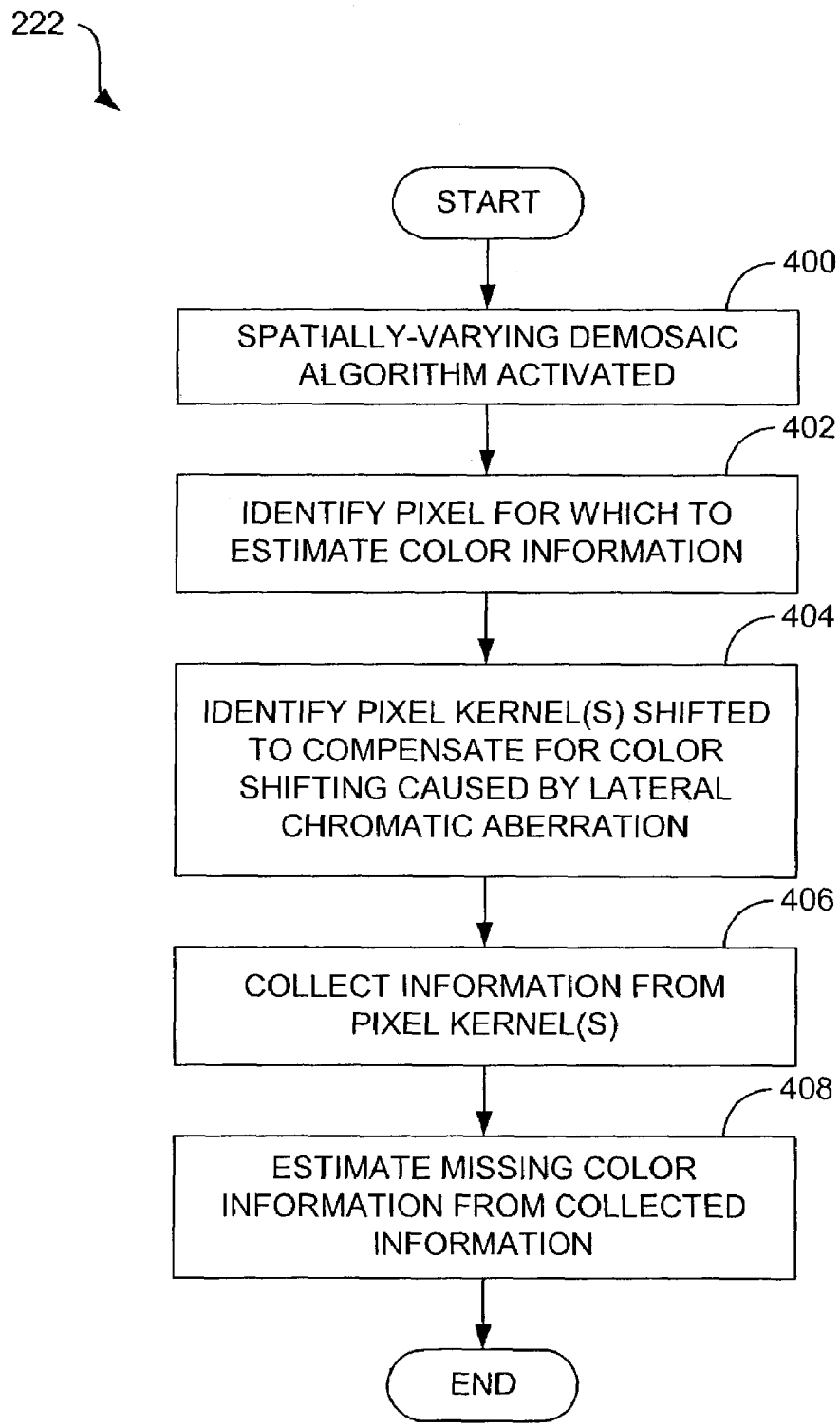
FIG. 4 is flow diagram illustrating an embodiment of operation of a spatially-varying demosaic algorithm of the device shown in FIG. 2.

FIG. 4 illustrates a first embodiment of operation of a spatially-varying demosaic algorithm 222 in counteracting the effects of lateral chromatic aberration. Beginning with block 400, a spatially-varying demosaic algorithm 222 is activated. This activation occurs for capture of new light information by the image capture device image sensor. With reference to block 402, the algorithm 222 identifies the pixel for which color information is to be estimated (i.e., the pixel under consideration). This pixel can be a pixel that collects light information of any single color captured by the image sensor. By way of example, the pixel is one of a red pixel, a blue pixel, or a green pixel.

Figure 5:
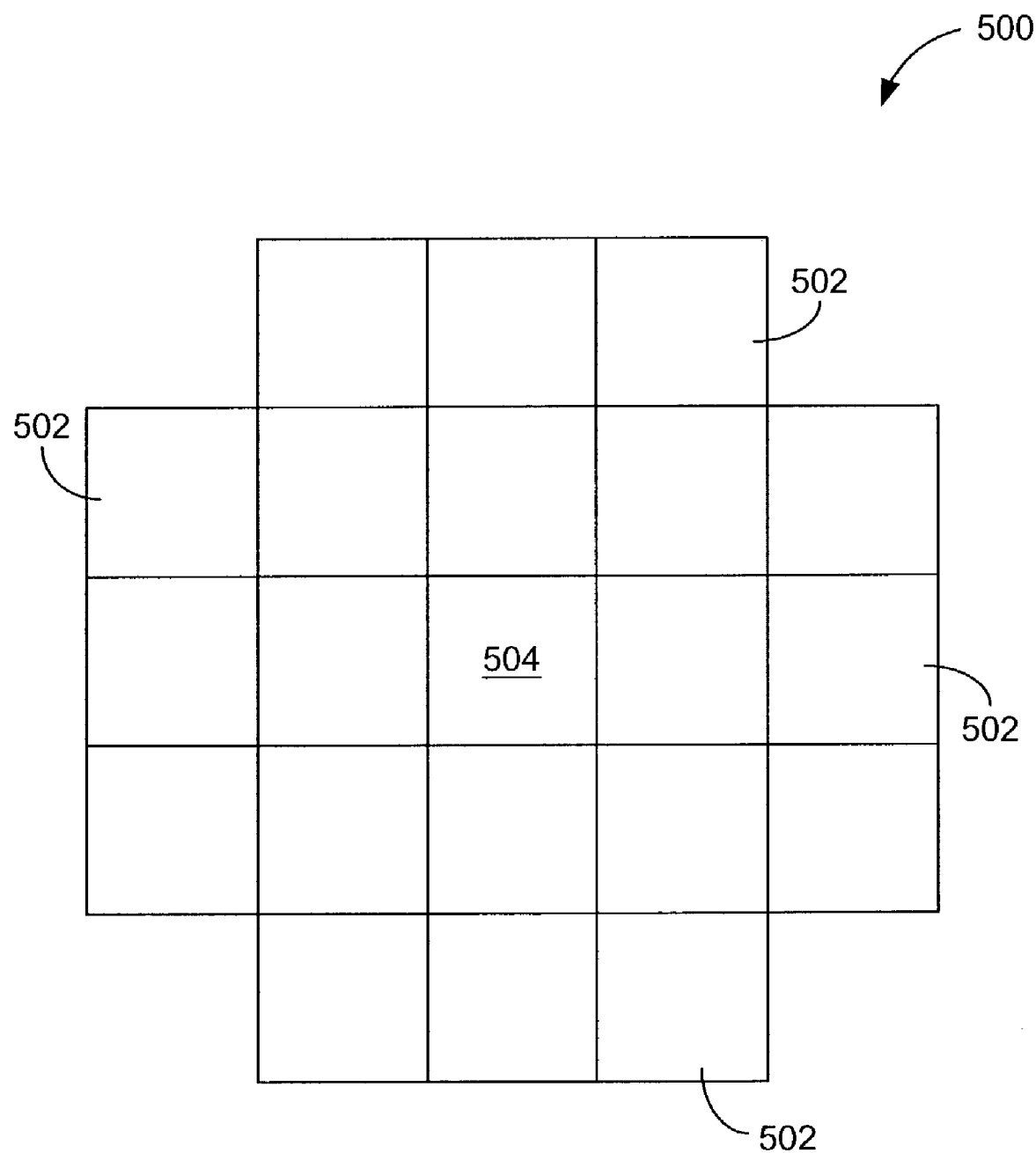
FIG. 5 is a schematic view of a five-by-five matrix of pixels that may be used in the method of FIG. 4.

With reference to block 404, a kernel comprising information collected by pixels adjacent the pixel under consideration is identified. More particularly, identified is a "shifted" kernel comprising information from pixels shifted, relative to the pixel under consideration, in a direction of color shifting caused by lateral chromatic aberration. An example kernel 500 is represented in FIG. 5. As indicated in this figure, the kernel 500 comprises information collected by a five-by-five matrix of pixels 502. The matrix is centered about a central pixel 504 such that the kernel encompasses information from pixels 502 from two adjacent rows above and below the central pixel, and pixels from two adjacent columns left and right of the central pixel. Although a five-by-five matrix (kernel) is illustrated in FIG. 5 and is described herein, alternative configurations may be used. For instance, the kernel may comprise information from a seven-by-seven matrix that includes pixels from three adjacent rows above and below a central pixel, and from three adjacent rows left and right of the central pixel.

Figure 6A:
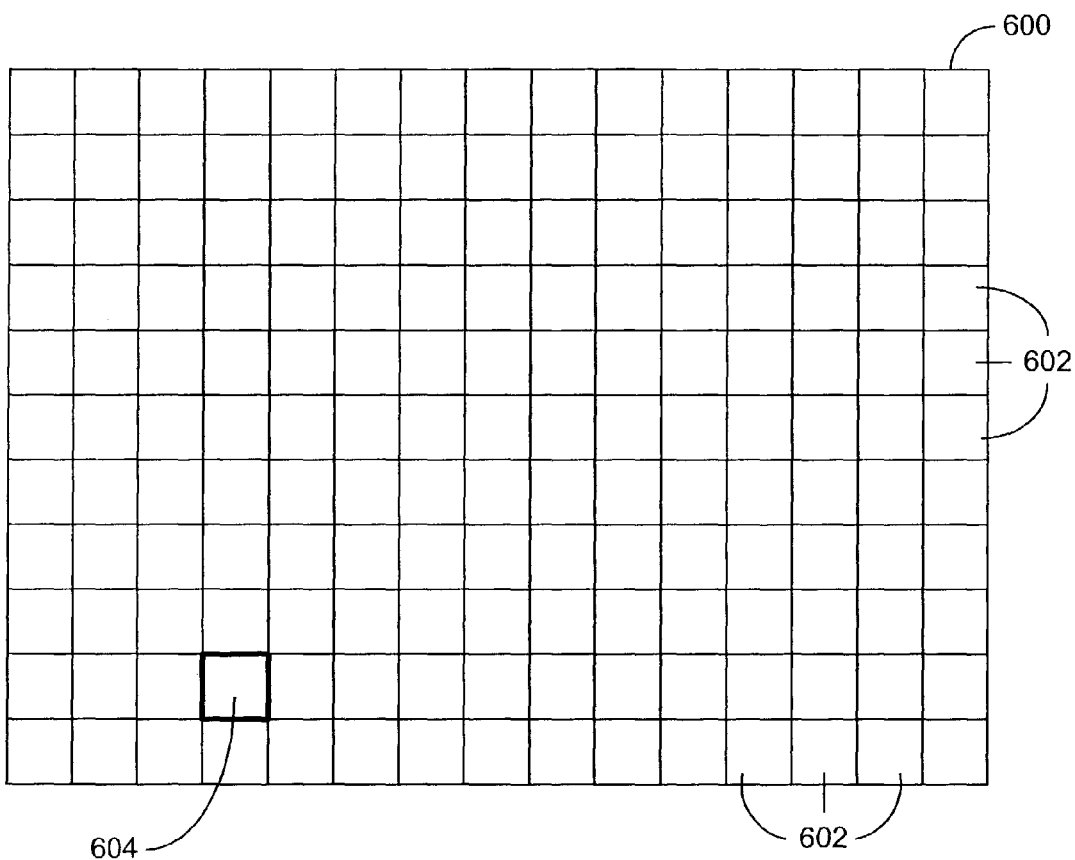
FIG. 6A is a schematic view of an image sensor prior to demosaicing.
Figure 6B:
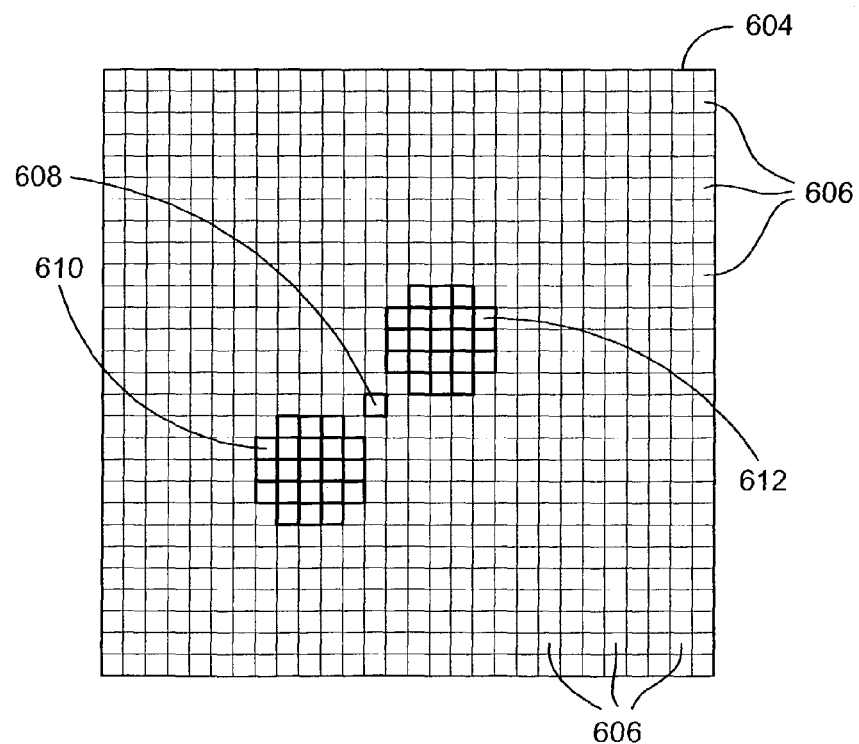
FIG. 6B is a schematic view of pixel data from the image sensor of FIG. 6A, and depicts usage of shifted kernels during the demosaicing process.

The position of the identified (selected) kernel is shifted relative to the pixel under consideration to compensate for the color shifting that results from lateral chromatic aberration. FIGS. 6A and 6B depict an example of identification of such shifted kernels. With reference first to FIG. 6A, illustrated is an image sensor 600. The sensor 600 is divided into sections 602, in this case squares, that each contains a group of pixels. FIG. 6B illustrates the pixels contained within one section 604 that is spaced from the center of the sensor 600 and, therefore, is affected by lateral chromatic aberration. As shown in FIG. 6B, the section 604 comprises a plurality of pixels 606 arranged in a two-dimensional array. In this example, a pixel 608 near the center of the section 604 is the pixel under consideration and, therefore, the pixel for which color information is to be estimated.

Figure 1:
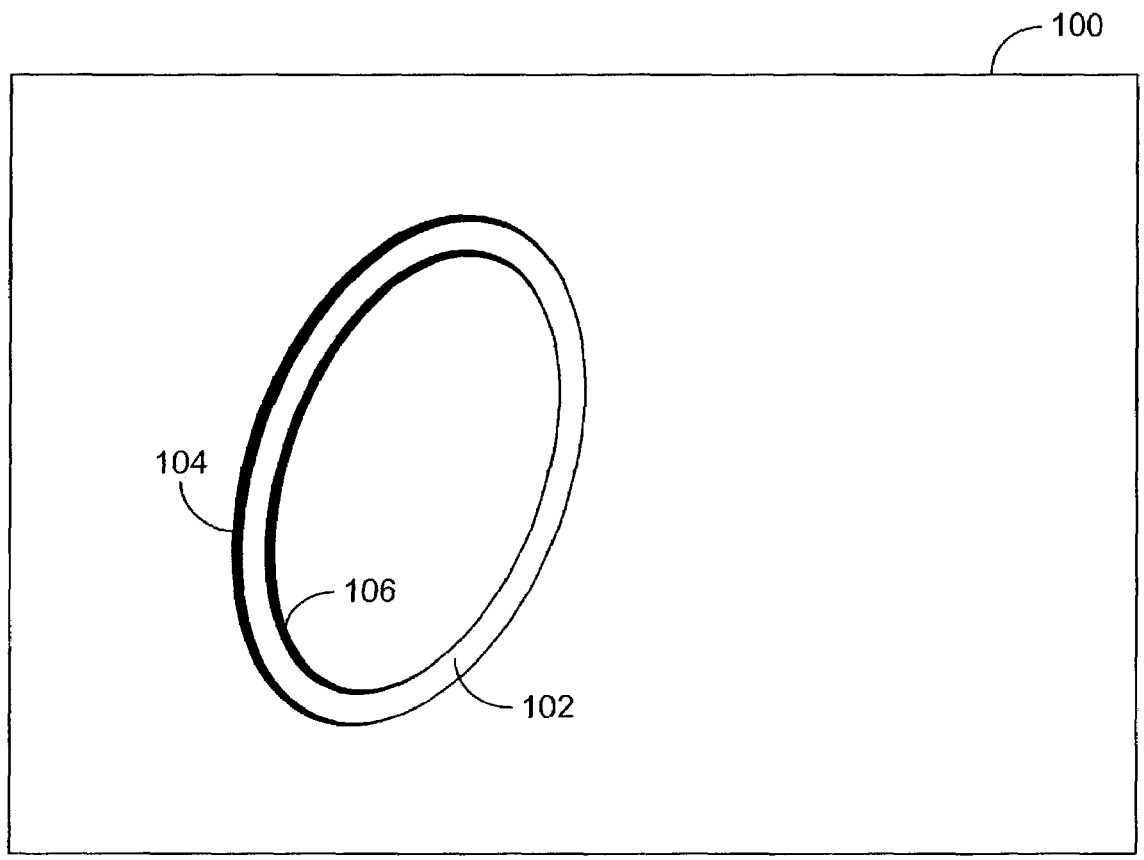
FIG. 1 is a schematic view showing an example of an image that contains color fringes resulting from lateral chromatic aberration.

FIG. 6B illustrates matrices of pixels that are used to generate two shifted kernels. The first matrix 610 is used to estimate color information for the pixel 608 for a color that is shifted toward the center of the image sensor 600, and therefore toward the center of images captured by the sensor. Accordingly, the first matrix 610 is shifted toward the left and downward relative to the pixel 608 to compensate for a lateral chromatic aberration color shift in the same direction relative to the pixel 608. With reference back to the color shifting example of FIG. 1, the first matrix 610 (and its associated kernel) is appropriate for correcting shifting that created the blue fringe 106. In similar manner, the second matrix 612 (and its associated kernel) is shifted toward the right and upward relative to the pixel 608 so as to correct color shifting in the same direction relative to the pixel 608 caused by lateral chromatic aberration. With reference again back to the color shifting example of FIG. 1, the second matrix 612 (and its associated kernel) is appropriate for correcting shifting that created the red fringe 104.

Although FIG. 6B illustrates a particular positioning of the matrices (and therefore the kernels), this positioning depends upon the characteristics of the lens system, as well as the location of the pixel under location. Normally, however, unless no shifting is deemed necessary, the center (e.g., central pixel 504, FIG. 5) of the pixel matrix will be shifted relative to the pixel under consideration. It is noted that, in addition to the direction in which the pixel under consideration lies relative to the center of the sensor, the distance of the pixel from the center of the sensor may affect the kernel selection. In particular, pixels located farther away, in a radial direction, from the center of the sensor require pixel matrices (and kernels) that are shifted a greater distance away from the pixel under consideration. In the above example, the kernels used to derive the missing colors are shifted by three pixel positions in both the horizontal and vertical directions. Other amounts of horizontal and vertical shifting are used for other zones of the image, depending on the direction and distance from the center of the image. Note also that shifts of non-integer pixel distances are also possible. This is accomplished by appropriately modifying the coefficient weights of the kernel. Normally, the coefficient weights are symmetrical about the center of the kernel. An asymmetrical set of coefficient weights will shift the centroid of the calculation a fraction of a pixel position.

Referring back to FIG. 4, and block 406, the algorithm 222 then collects the information obtained by the pixels of the shifted kernel(s) identified in block 404. From this information, the algorithm 222 next estimates the missing color information for the pixel under consideration, as indicated in block 408. Through use of the shifted kernels, the color information for the pixel under consideration can be estimated with greater accuracy in a manner that compensates for or corrects the shifting caused by the lateral chromatic aberration of the lens system. Accordingly, color fringes are eliminated or reduced in magnitude to reduce the image blurring that they cause.

Figure 7:
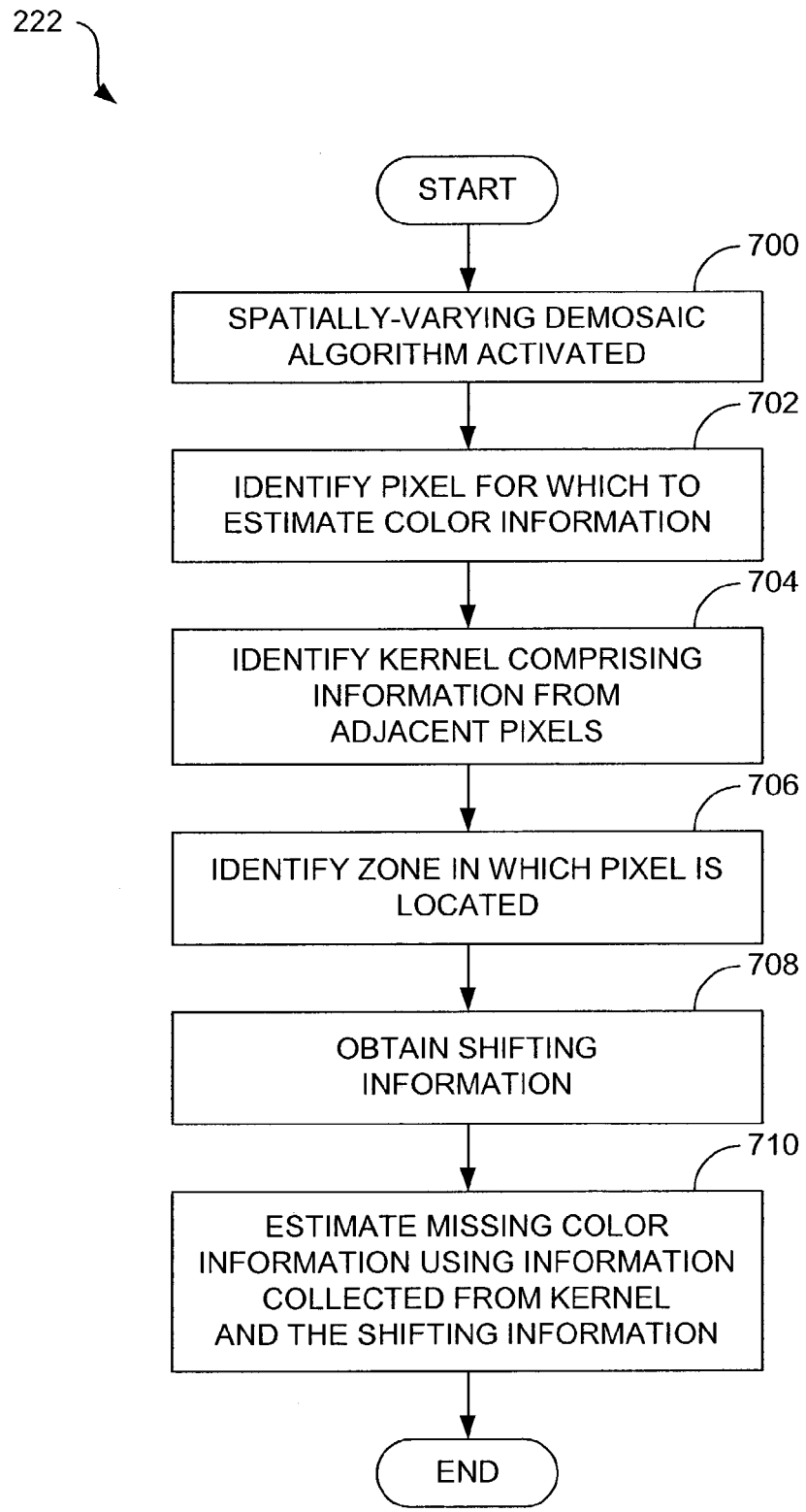
FIG. 7 is flow diagram illustrating another embodiment of operation of a spatially-varying demosaic algorithm of the device shown in FIG. 2.
Figure 8:
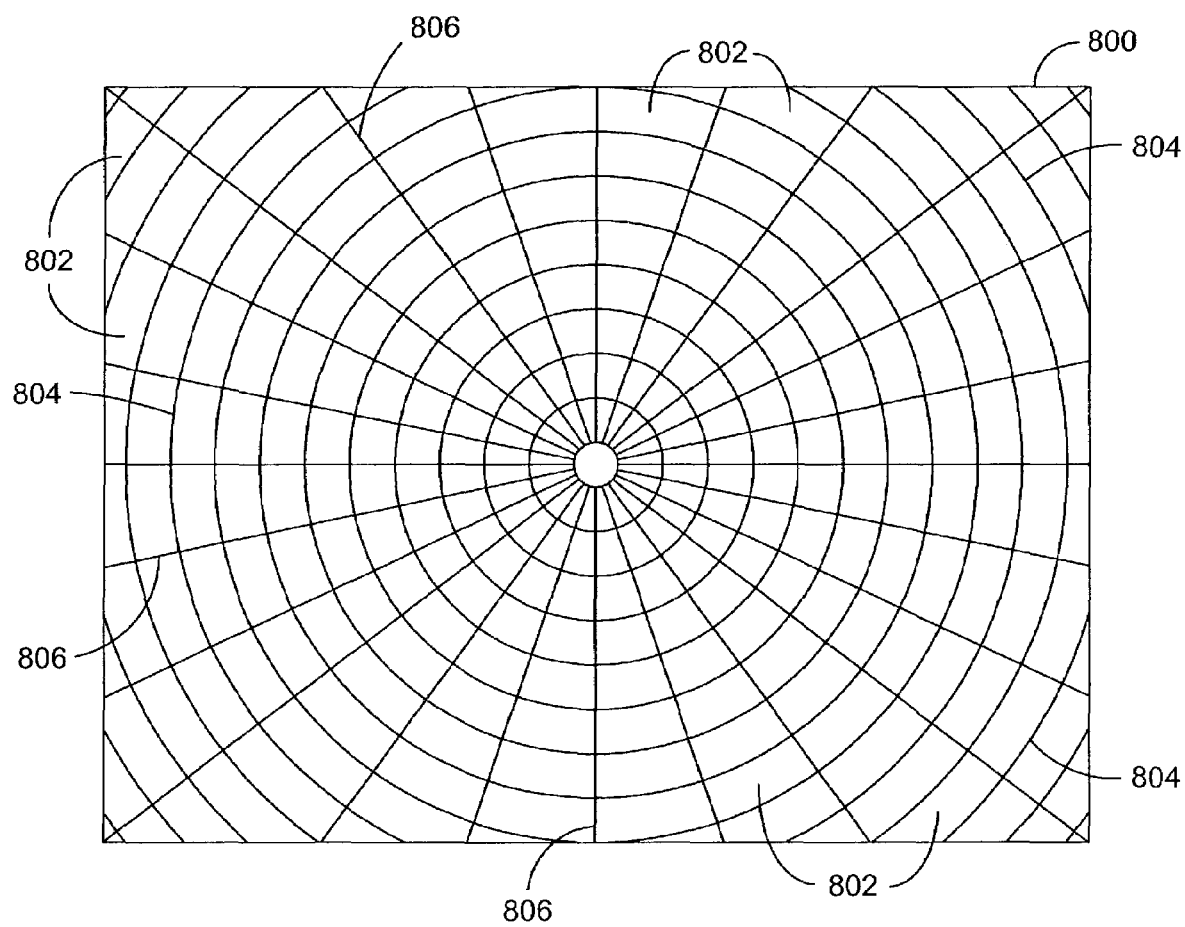
FIG. 8 is a schematic view of image data that is divided into various zones for the purpose of spatially-varied demosaicing.

FIG. 7 illustrates a second embodiment of operation of a spatially-varying demosaic algorithm 222 in counteracting the effects of lateral chromatic aberration. Beginning with block 700, a spatially-varying demosaic algorithm 222 is activated. Again, this activation occurs whenever new light information is captured by the device image sensor. Next, with reference to block 702, the algorithm 222 identifies the pixel for which to estimate color information (i.e., the pixel under consideration). With reference to block 704, a kernel comprising information from pixels adjacent the pixel under consideration is identified. In this case, however, the kernel may comprise a kernel that is centered about the pixel under consideration, or may comprise a kernel that is shifted with respect to the pixel under consideration Referring next to block 706, a zone in which the pixel under consideration is located is determined. FIG. 8 illustrates an example arrangement of radial zones of an image sensor 800. As indicated in FIG. 8, the zones 802 are defined by circular boundaries 804 in the form of circles positioned at given radial distances from the center of the sensor 800, and by boundaries 806 in the form of lines that extend radially from the center of the sensor. Alternatively, the zones may be arranged in simple square or rectangular grid patterns. Such an implementation simplifies the calculation needed to determine to which zone the pixel under consideration belongs.

Associated with each zone 802 is shifting information, for instance shifting coefficients, that are used to modify the color information estimation performed by the demosaicing algorithm 222. In particular, the information modifies the algorithm so that the algorithm computes the color information for the pixel under consideration as a function of the position of the pixel under consideration and its distance from the center of the sensor.

Application of this shifting information modifies the color information estimation to account for the color shifting caused by the lateral chromatic aberration of the lens system. Accordingly, this information shifts the emphasis to information collected from pixels located in a direction, relative to the pixel under consideration, in the color shifting direction caused by the aberration. In that such color shifting increases as a function of distance away from the center of the sensor, information collected from pixels farther away from the pixel under consideration will be weighted more for pixels located a greater distance from the center of the sensor. By way of example, the shifting information (e.g., shifting coefficients) is stored within the database 224 (e.g., in a table) and accessed by the demosaic algorithm 222 through an appropriate lookup process.

Returning to FIG. 7, once the zone in which the pixel under consideration has been determined, the shifting information is obtained, as indicated in block 708 and, as indicated in block 710, the demosaic algorithm 222 estimates the missing color information using the information collected from the pixels of the identified kernel and from the shifting coefficients.

It is noted that the systems and methods described in this disclosure correct lateral chromatic aberration such that less emphasis may be placed upon physically correcting lateral chromatic aberration through lens system design. Therefore, the lens system designer may instead focus on correcting other forms of aberration, thereby simplifying the lens system design problem. As a result, the lens design may be simpler and cheaper for a given set of design requirements and performance levels. Alternatively, other lens attributes, such as zoom range, distortion, vignetting, etc., may be improved for a given lens cost and size.

What is claimed is:

1. A method for providing spatially-varied demosaicing, the method comprising:
   collecting color information sensed by image sensor pixels;
   identifying a pixel under consideration for which color information that the pixel does not collect is to be estimated;
   defining a kernel formed of a matrix of pixels of the image sensor, the kernel being shifted relative to the pixel under consideration such that the pixel under consideration is not positioned in the center of the kernel, the kernel being laterally shifted in a direction in which a color to be estimated shifts due to lateral chromatic aberration caused by a lens system; and
   estimating the color information for the pixel under consideration by evaluating information collected by the pixels of the kernel.

2. The method of claim 1, wherein a degree to which the kernel is shifted is proportional to the distance between the pixel under consideration and a center of the image sensor.

3. The method of claim 2, wherein the kernel is shifted farther relative to the pixel under consideration as the pixel under consideration is positioned farther from the center of the image sensor.

4. The method of claim 1, wherein the color information is one of red, green, or blue color information.

5. The method of claim 1, wherein the kernel comprises a five-by-five matrix of pixels.

6. The method of claim 1, wherein the kernel comprises a seven-by-seven matrix of pixels.

7. A system for providing spatially-varied demosaicing relative to an image sensor, the system comprising:
   a processor; and
   memory that comprises a spatially-varying demosaic algorithm, the algorithm being configured to estimate color information for a pixel under consideration in the image sensor by defining a kernel formed of a matrix of pixels of the image sensor, the kernel being laterally shifted relative to the pixel under consideration to account for lateral chromatic aberration such that the pixel under consideration is not positioned in the center of the kernel, and estimating the color information for the pixel under consideration by evaluating information collected by the pixels of the kernel.

8. A system, comprising:
   means for collecting color information transmitted by a lens system that introduces lateral chromatic aberration; and
   means for estimating missing color information for a pixel under consideration using color information collected from a group of pixels adjacent the pixel under consideration, the group being laterally shifted relative to the pixel under consideration such that the pixel under consideration is not positioned in the center of the group, the group being laterally shifted in a direction in which a color to be estimated shifts due to lateral chromatic aberration caused by the lens system.

9. The system of claim 8, wherein the means for collecting color comprises an image sensor.

10. The system of claim 8, wherein the means for estimating comprises a demosaic algorithm.

11. A digital camera, comprising:
   a lens system that introduces lateral chromatic aberration;
   an image sensor comprising a plurality of pixels, the image sensor used to receive light transmitted by the lens system;
   a processor that processes light received by the image sensor; and
   memory that comprises a spatially-varying demosaic algorithm, the algorithm being configured to estimate color information for a pixel under consideration that is not collected by the pixel under consideration by defining a kernel formed of a matrix of pixels of the image sensor, the kernel being laterally shifted relative to the pixel under consideration to account for lateral chromatic aberration such that the pixel under consideration is not positioned in the center of the kernel, and evaluating information collected by the pixels of the kernel.

* * * * *